(12) United States Patent
Zach et al.

(10) Patent No.: US 10,221,880 B2
(45) Date of Patent: Mar. 5, 2019

(54) DRILLING SCREW

(71) Applicant: SFS intec Holding AG, Heerbrugg (CH)

(72) Inventors: Marco Zach, Diepoldsau (CH); Rene Dutler, Eichberg (CH); Ralf Steyer, Steinach (CH)

(73) Assignee: SFS intec Holding AG, Heerbrugg (CH)

( * ) Notice: Subject to any disclaimer, the term of this patent is extended or adjusted under 35 U.S.C. 154(b) by 193 days.

(21) Appl. No.: 15/503,493

(22) PCT Filed: Aug. 10, 2015

(86) PCT No.: PCT/EP2015/068343
§ 371 (c)(1),
(2) Date: Feb. 13, 2017

(87) PCT Pub. No.: WO2016/023855
PCT Pub. Date: Feb. 18, 2016

(65) Prior Publication Data
US 2017/0241466 A1     Aug. 24, 2017

(30) Foreign Application Priority Data
Aug. 14, 2014   (DE) .................. 10 2014 012 142

(51) Int. Cl.
*F16B 35/00*   (2006.01)
*F16B 33/06*   (2006.01)
*F16B 25/00*   (2006.01)

(52) U.S. Cl.
CPC .......... *F16B 33/06* (2013.01); *F16B 25/0021* (2013.01)

(58) Field of Classification Search
USPC ....................................... 411/387.1
See application file for complete search history.

(56) References Cited

U.S. PATENT DOCUMENTS

| 3,914,178 | A | * | 10/1975 | Fineran | F16B 33/06 |
| | | | | | 508/103 |
| 4,414,247 | A | * | 11/1983 | Hubecker | F16B 33/06 |
| | | | | | 427/230 |
| 4,692,988 | A | * | 9/1987 | Shulver | E21B 17/042 |
| | | | | | 285/334 |

(Continued)

FOREIGN PATENT DOCUMENTS

| DE | 202005013320 | 12/2006 |
| DE | 202012101519 | 8/2012 |

(Continued)

*Primary Examiner* — Gary W Estremsky
(74) *Attorney, Agent, or Firm* — Volpe and Koenig, P.C.

(57) ABSTRACT

A self-drilling screw composed of an austenitic or some other non-corrosive base material (1) is provided, having a shank (12), having a cutting or shaping drilling or threaded tip (16) arranged at one shank end and having a hard coating (3) applied at least to the drilling or threaded tip (16) by electrodeposition, this hard coating (3) having a layer containing a transition metal, for example a hard chromium layer. The shank (12) has a hard edge layer (2) at least under the hard coating (3). A topcoat (4) composed of a lubricating and heat-dissipating material, which preferably is metal, wax and/or lacquer, is applied to the hard coating (3).

14 Claims, 3 Drawing Sheets

(56) References Cited

U.S. PATENT DOCUMENTS

| | | | | |
|---|---|---|---|---|
| 4,730,970 | A * | 3/1988 | Hyner | C21D 9/0093 411/387.4 |
| 4,802,807 | A * | 2/1989 | Offenburger | C23C 14/16 411/387.1 |
| 5,417,776 | A * | 5/1995 | Yoshino | C23C 8/80 148/230 |
| 5,419,948 | A * | 5/1995 | Yoshino | C21D 9/0093 411/411 |
| 8,613,579 | B2 * | 12/2013 | Loichinger | F16B 25/0031 411/387.1 |
| 9,194,416 | B2 | 11/2015 | Zach et al. | |
| 2001/0014262 | A1 * | 8/2001 | Friederich | C21D 6/02 411/386 |
| 2006/0228575 | A1 | 10/2006 | Klos | |
| 2007/0111909 | A1 * | 5/2007 | Combetta | C10M 111/04 508/450 |
| 2013/0004261 | A1 * | 1/2013 | Pattinson | F16B 33/06 411/366.1 |
| 2013/0129446 | A1 * | 5/2013 | Dieterle | F16B 35/00 411/378 |

FOREIGN PATENT DOCUMENTS

| | | |
|---|---|---|
| DE | 102012009400 | 11/2013 |
| EP | 2716789 | 4/2004 |
| JP | 2007333186 | 12/2007 |
| WO | 9425764 | 11/1994 |

* cited by examiner

DRILLING SCREW

BACKGROUND

The invention relates to a self-drilling screw produced from an austenitic or other stainless base material, comprising a shank which has a cutting or forming boring tip or thread crest arranged on a shank end and a hard edge layer formed on the surface of the shank in the region of the boring tip or thread crest and at least in the region of a thread connecting thereto.

DE 10 2012 009 400 B4, which relates to a patent also by the applicant, discloses a self-drilling screw formed in one piece. This known self-drilling screw has a simpler design than a two-part self-drilling screw in which the two parts are welded together, one of these two parts comprising the boring tip and the thread-forming region and, by way of example, consisting of carbon steel which has, in a final step, been hardened by induction or flame hardening.

This known screw is only ever used once. A hard coating which is galvanically applied to the boring tip or thread crest and comprises a transition metal layer or chromium layer has been found to be stable for the single drilling process required for this purpose. Simple coating such as chromating or hard chromating or, more generally, galvanically applying the hard coating as a layer that contains a transition metal, is sufficient at least with suitable additives to be able to use the known self-drilling screw at least once. In this case, contrary to the opinion of a person skilled in the art, hard coatings of this type can be achieved without the eggshell effect occurring. The self-drilling screw according to the aforementioned document achieves, owing to the coating applied, the required drilling capacity and the required thread formation.

A self-drilling screw of the type mentioned at the outset is known from U.S. Pat. No. 5,419,948 A. In order to harden said known self-drilling screw, it is chemically reacted, i.e. nitrated, with nitrogen trifluoride on its surface. As a result of the nitration, the known screw, which is stainless per se, produces an ultra-hard surface layer which is susceptible to rust and has to be removed again after the nitration, specifically in the region of the screw head.

U.S. Pat. No. 4,802,807 A discloses a self-drilling screw for which corrosion resistance by galvanising, i.e. by galvanically applied zinc, is achieved. In addition, for this known self-drilling screw, an aluminium protective layer is produced on the zinc protective layer. The aluminium protective layer is applied to the galvanised screw by means of ion vapour precipitation technology. The composite protective layer thus produced is intended not only to improve corrosion resistance but also to reduce the torque when screwing in the self-drilling screw. Finally, a topcoat is applied to the self-drilling screw in order to prevent the aluminium protective coating from oxidising.

SUMMARY

Proceeding from a self-drilling screw according to the above-cited document U.S. Pat. No. 5,419,948 A, the object of the invention is to improve the drilling capacity and the thread formation in a simple manner.

Proceeding from this known self-drilling screw, the sought further improvement in the drilling capacity and the thread formation is achieved according to the invention in that a hard coating is galvanically applied at least to the hard edge layer of the boring tip or thread crest, which hard coating comprises a layer containing a transition metal, and in that a topcoat made of a lubricating and heat-dissipating material is applied to the hard coating.

In the self-drilling screw according to the invention, the hard edge layer improves the adhesiveness of the hard coating galvanically applied thereto. In turn, the hard coating improves the adhesiveness of the topcoat applied thereto. Since the topcoat is produced from a lubricating and heat-dissipating material, it in turn improves the stability of the hard coating. This improvement in the stability of the hard coating leads to the sought improvement in the drilling capacity and the thread formation. The sought improvement in the drilling capacity and the thread formation is achieved for the self-drilling screw according to the invention, which is inherently stainless, without the self-drilling screw being placed in a state in which it is susceptible to rust that has to be removed again at least in part.

The prevention of the eggshell effect mentioned at the outset is reliably achieved for the self-drilling screw according to the invention owing to the hard edge layer, which the shank has under the hard coating.

Topcoats made of a lubricating antifriction lacquer are already known, for example the lubricating lacquer F 417, according to technical product information available to the applicant from the company Tevier Öl-Fenkart GmbH, which is based in 6845 Hohenems, Austria. This antifriction lacquer, which contains $MoS_2$, is pressure-resistant and is intended to achieve lifetime lubrication of general mechanical engineering components, automobile industry components and supplier industry components. Specifically, said antifriction lacquer can also be used for screws; however, the use of such antifriction lacquers for self-drilling screws is not known to the applicant.

The topcoat that is applied to the hard coating in accordance with the invention and that is made of a lubricating and heat-dissipating material not only improves heat-dissipation but also reduces the heat produced during the screwing-in process of the self-drilling screw according to the invention by reducing friction, and therefore said topcoat not only dissipates heat but also reduces the amount of heat to be dissipated overall.

The hard edge layer can be achieved in particular by selecting a suitable strain when the self-drilling screw is formed and before the hard coating is galvanically applied to the shank of the self-drilling screw.

For the self-drilling screw according to the invention, the hard edge layer and the hard coating applied thereto as well as the topcoat applied to the hard coating ensure one-time drilling and the formation of the thread in steel along with optimal drilling capacity and optimal thread formation.

For the self-drilling screw according to the invention, heat dissipation is ensured over a large surface area and owing to a special topology of the surface, which also encourages the adhesion of the topcoat.

The characteristics of the hard coating and of the topcoat such as layer thickness, hardness, adhesiveness, antifriction properties, roughness, temperature resistance and thermal conductivity can each be optimised depending on the use.

The description and claims advantageous embodiments of the invention.

In an embodiment of the self-drilling screw according to the invention, the lubricating and heat-dissipating material comprises metal, wax and/or lacquer. As a result of this alone, the above-mentioned characteristics of the hard coating can be optimised depending on the use.

In another embodiment of the self-drilling screw according to the invention, the hard coating, together with the topcoat, has a thermal conductivity of $\lambda > 9$ W/mK, as a result of which the sought optimisation in terms of drilling capacity and thread formation is achieved even more reliably.

In another embodiment of the self-drilling screw according to the invention, the topcoat comprises a layer which intrinsically has differences in layer thickness of up to +/−60%, as a result of which the adhesion of the topcoat to the hard coating is ensured even more securely.

In another embodiment of the self-drilling screw according to the invention, the topcoat comprises a layer which intrinsically has differences in layer thickness of up to +/−30%. These maximum differences in layer thickness are easier to achieve than for the previously mentioned embodiment of the self-drilling screw according to the invention, but also ensure sufficient adhesion of the topcoat to the hard coating and sufficient heat dissipation through the topcoat.

In another embodiment of the self-drilling screw according to the invention, the topcoat is mixed with metal particles. These particles can, as is known per se, consist of $MoS_2$, i.e. of at least lubricating particles. The inventors have identified that an improvement in the heat dissipation during the screwing-in process of the self-drilling screw according to the invention can also be achieved by means of such particles used per se for lubrication.

However, an improvement in heat dissipation surprisingly also results from using only heat-dissipating particles made of Au, Ag, Cu or the like, which constitute another embodiment of the self-drilling screw according to the invention. As a general principle, most of the heat is given off via the cutting that results during the drilling process, lacquer and/or wax (having and not having metal particles or metal powder) still positively assisting this effect, however.

In another embodiment of the self-drilling screw according to the invention, the base material has a hardness of from 100 to 300 HV0.1 and preferably from 150 to 200 HV0.1. A base material having such a hardness has proven to be particularly advantageous.

In another embodiment of the self-drilling screw according to the invention, the hard edge layer has a hardness of from 300 to 600 HV0.1. A hard edge layer having such a hardness has proven to be particularly advantageous.

In another embodiment of the self-drilling screw according to the invention, the hard coating has a serrated or beaded topography. It had been found that both types of topography ensure sufficient differences in thickness, which ensure sufficient adhesion of the topcoat.

In another embodiment of the self-drilling screw according to the invention, the hard coating has a hardness of at least 700 HV0.1. A hard coating having such a hardness has proven to be advantageous.

In another embodiment of the self-drilling screw according to the invention, the hard coating has a hardness of between 800 and 1400 HV0.1. A hard coating having such a hardness has proven to be particularly advantageous.

In another embodiment of the self-drilling screw according to the invention, the hard coating has a maximum thickness of 60 μm. This thickness of the hard coating has proven to be appropriate for ensuring drilling capacity and thread formation of the self-drilling screw and for the adhesion of the topcoat to the hard coating.

The invention further provides the use of a self-drilling screw according to one or more features of the invention for producing a connection to at least one steel connection element through which the self-drilling screw is drilled, this use being particularly suitable when one of at least two components to be fastened to one another is exposed to weathering. The production of the self-drilling screw according to the invention from a stainless base material means that the part of the self-drilling screw which is exposed to weathering does not require additional rust protection as is the case for the conventional two-part self-drilling screw according to the German patent DE 10 2012 009 400 B4 which is mentioned at the outset, or as is the case for the self-drilling screw according to U.S. Pat. No. 4,802,807 A. The boring tip, that is to say the part of the conventional two-part self-drilling screw that is exposed to weathering, requires special measures for the corrosion resistance thereof because the boring tip consists of carbon steel so that it can be hardened. The thread-forming region of the conventional two-part screw consists of stainless steel.

BRIEF DESCRIPTION OF THE DRAWINGS

Advantageous embodiments of the invention are described in greater detail in the following with reference to the drawings, in which.

DETAILED DESCRIPTION OF THE PREFERRED EMBODIMENTS

Figure 1:
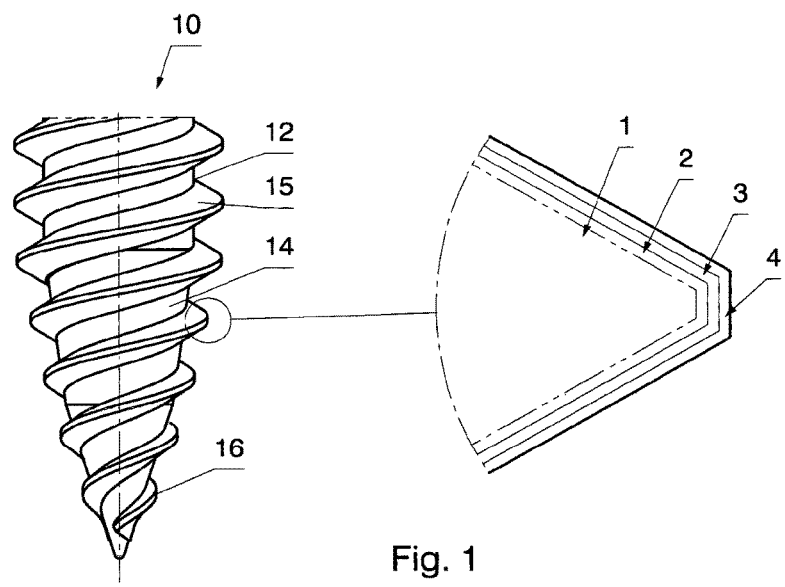
FIG. 1 shows, as a first embodiment of the invention, a metal self-drilling screw which is provided with a thread crest and, as a larger scale detail, a thread flank.

FIG. 1 shows, as a first embodiment of the invention, a metal self-drilling screw 10 comprising a shank 12 which has a thread-forming region 14 and a thread crest 16. The screw has a head, for example a conventional hexagonal head (not shown in FIG. 1, however). The metal self-drilling screw 10 is produced in a single piece from an austenitic or other stainless steel, which forms the base material of the screw. FIG. 1 also shows, as a larger scale detail, a thread flank of the metal self-drilling screw 10. In this detail, the base material of the screw is denoted by reference sign 1. The shank 12 is designed so as to be harder, at the surface in the region of the drill tip 16 and at least in the region of a thread 15 connected thereto, than the remainder of the metal self-drilling screw 10. This harder design of the surface is important in order for the metal self-drilling screw 10 to be able to perform its function, specifically to drill a hole using the thread crest 16 and subsequently to form a thread in the hole. The austenitic or other stainless base material 1 of the self-drilling screw 10 would specifically not be inherently suitable for this purpose. The base material would be too soft for this purpose.

In the harder region, the metal self-drilling screw 10 is provided with a hard edge layer 2 and this in turn is provided with a hard coating 3. The self-drilling screw 10 comprises a hard edge layer 2 at least in the region below the hard coating 3. The hard coating 3 is galvanically applied as a thin layer, for example as a hard chromium layer, in particular according to German patent DE 25 02 284 C2, to the hard edge layer 2. Instead of a hard chromium layer, a layer containing a transition metal can generally be selected, which layer can be galvanically applied.

The hard edge layer 2 can be achieved in particular by selecting a suitable strain when the metal self-drilling screw 10 is formed and before the hard coating 3 is galvanically applied to the shank 12 and the thread crest 16 of the metal self-drilling screw. Aside from the hard coating 3, the metal self-drilling screw 10 is produced in a conventional manner by a screw blank being mechanically shaped, i.e. rolled, and in the process being provided with the thread crest 16 and remaining thread of the metal self-drilling screw 10. The larger the strain, the harder the hard edge layer 2 is formed.

The base material 1, which is used in the metal self-drilling screw according to the invention, has a hardness of from 100 to 300 HV0.1 and preferably from 150 to 200 HV0.1. The hard edge layer 2 has a hardness of from 300 to 600 HV0.1.

The hard coating 3 has a serrated or beaded topography and has a maximum thickness of 60 μm. The hard coating also has a hardness of at least 700 HV0.1 and preferably a hardness of between 800 and 1400 HV0.1.

Figure 2:
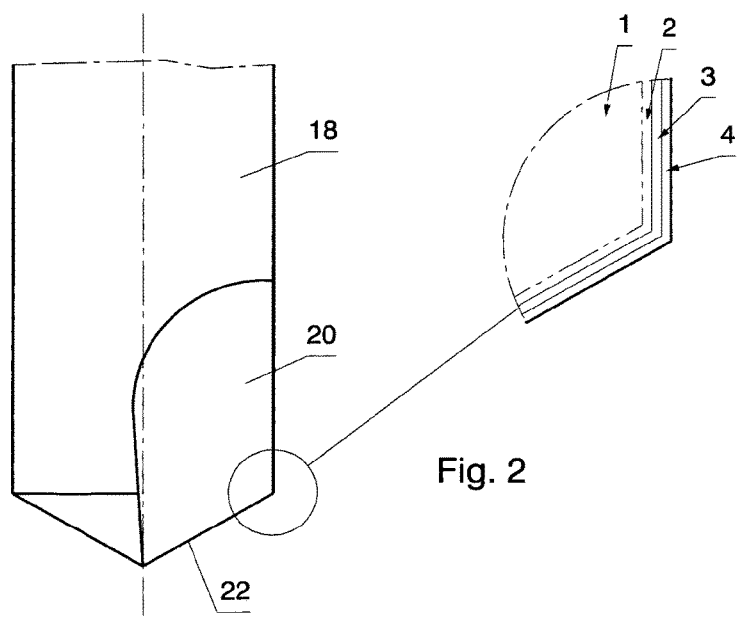
FIG. 2 shows a boring tip of a second embodiment of the self-drilling screw according to the invention, together with a larger scale detail of a corner of the boring tip.
Figure 8:
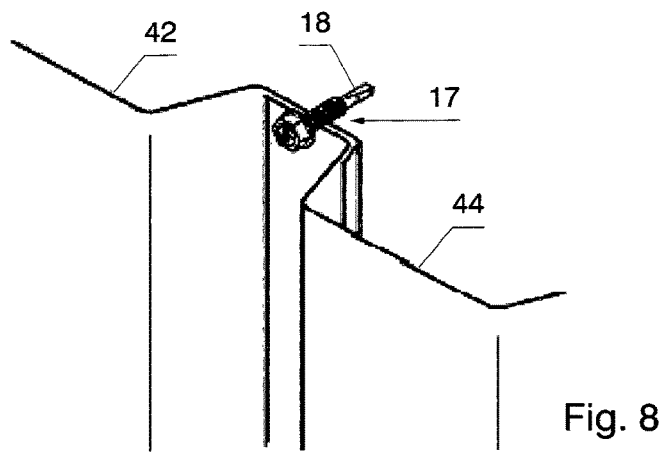
FIG. 8 shows, as a third example of a use of the self-drilling screw according to the invention, a mutual fastening of two trapezoidal metal sheets.

FIG. 2 shows a boring tip of a second embodiment of a self-drilling screw 17 shown in FIG. 8, which is provided with a boring tip 18 instead of a thread crest as is the case for the metal self-drilling screw 10 according to FIG. 1. A shank such as the shank 12 is attached to the top of said boring tip 18, which shank has a thread such as the thread of the shank 12 in FIG. 1 (now shown in FIG. 2, however). The boring tip 18 is integrally moulded on the shank (not shown in FIG. 2) just as the thread crest 16 is integrally moulded on the shank 12. Unlike the thread crest 16, the boring tip 18 has a bit 20 having a cutting edge 22. The above comments made in relation to the metal self-drilling screw 10 thus also apply to the self-drilling screw shown in FIG. 2 only by its boring tip 18. FIG. 2 also shows a corner of the boring tip 18 in a larger-scale detail. This detail shows that the self-drilling screw according to FIG. 2 has the hard edge layer 2 and the hard coating 3 on the base material 1 thereof. Both for the metal self-drilling screw 10 according to FIG. 1 and for the self-drilling screw 17 according to FIGS. 2 and 8, a topcoat 4 made of a lubricating and heat-dissipating material is applied to the hard coating 3. A suitable lubricating and heat-dissipating material comprises metal, wax and/or lacquer. The topcoat is preferably mixed with metal particles which comprise $MoS_2$, Au, Ag or Cu.

Figure 3:
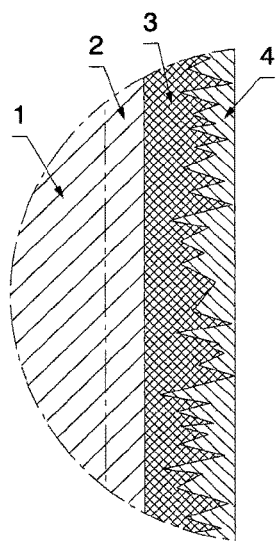
FIG. 3 is an even larger scale detail of a part of the detail according to FIG. 2 or FIG. 3.

FIG. 3 is an even larger scale detail of a part of the detail according to FIG. 2 or FIG. 3. In the embodiment shown in FIG. 3, the hard coating 3 has a jagged structure. The topcoat 4 applied to the hard coating 3 thus comprises a layer which intrinsically has differences in layer thickness. These differences in layer thickness are at most +/−60%, preferably a maximum of +/−30%.

The hard coating 3 together with the topcoat 4 has a thermal conductivity of $\lambda > 9$ W/mK.

Figure 4:
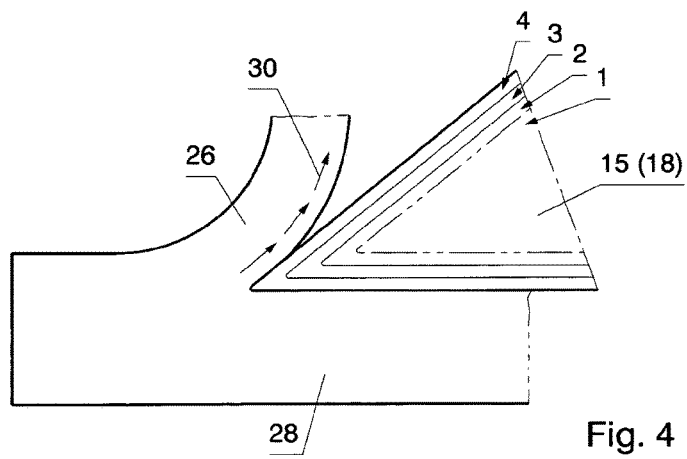
FIG. 4 symbolically shows the heat dissipation from a thread flank or boring tip via a cutting.
Figure 5:
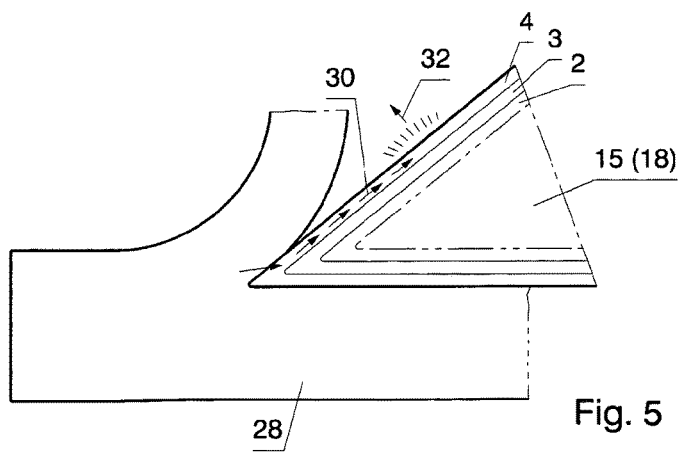
FIG. 5 shows, in the same view as FIG. 4, heat dissipation mainly over the surface of the thread flank or boring tip in a region adjacent to a cutting.

FIG. 4 symbolically shows the heat dissipation from the thread flank 15 or the boring tip 18 via a cutting 26 in the event that a hole is drilled into a workpiece 28, which hole is intended to be provided with threads. In FIG. 4, the workpiece 28 consists of a highly thermally conductive material, as a result of which the cutting 26 dissipates heat effectively, which heat is represented by a row of arrows 30 in FIG. 4. If the workpiece 28 consists of a poorly thermally conductive material or of a heat-insulating material, the heat resulting during the boring or -tapping process is introduced into the thread flank 15 or the boring tip 18 and is conveyed via the topcoat 4 to the outside, as is shown in FIG. 5 by a row of arrows 30 and an arrow 32.

Figure 6:
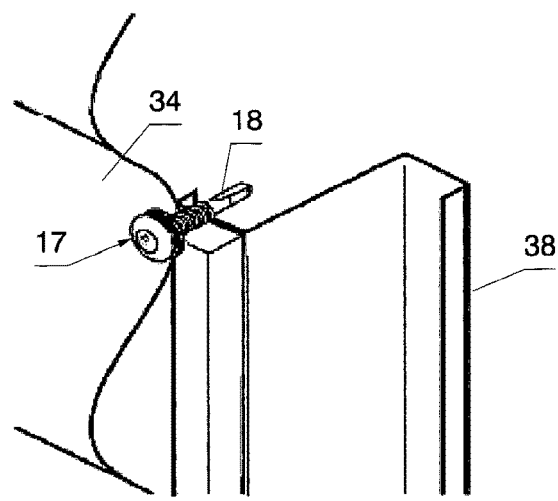
FIG. 6 shows, as a first example of a use of the self-drilling screw according to the invention, the fastening of a corrugated metal sheet to a vertical spar.
Figure 7:
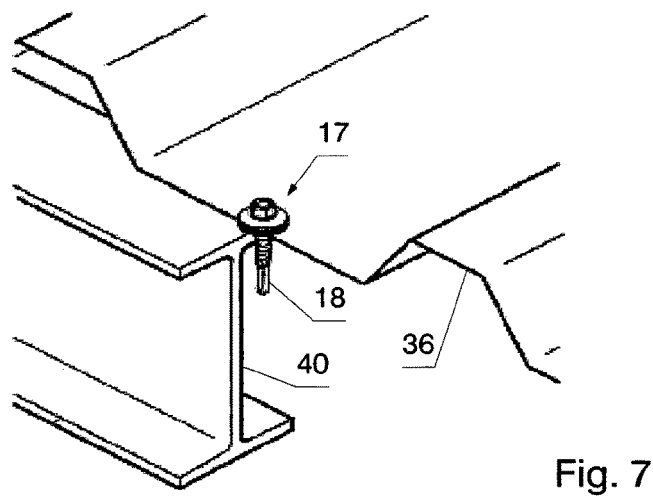
FIG. 7 shows, as a second example of a use of the self-drilling screw according to the invention, the fastening of a trapezoidal metal sheet to a Double T support.

FIGS. 6 to 8 show the use of the self-drilling screw 17 for producing a connection to at least one steel connection element, through which the self-drilling screw is drilled. The connection element is shown in these figures as a corrugated metal sheet 34 or as a trapezoidal metal sheet 36, 42 and 44. FIG. 6 shows, as a first example of the use of the self-drilling screw 17, the fastening of a corrugated metal sheet 34 to a vertical spar 38. FIG. 7 shows, as a second example of the use of the self-drilling screw 17, the fastening of a trapezoidal metal sheet 36 to a Double T support 40. FIG. 8 shows, as a third example of the use of the self-drilling screw 17, a mutual fastening of two trapezoidal metal sheets 42, 44. The screws 17 are shown in FIG. 6-8 having different heads.

LIST OF REFERENCE NUMERALS 1 base material
2 hard edge layer
3 hard coating
4 topcoat
10 metal self-drilling screw
12 shank
14 thread-forming region
15 thread flank
16 thread crest
17 self-drilling screw
18 boring tip
20 bit
22 cutting edge
24 topcoat
26 cutting
28 workpiece
30 arrow
32 arrow
34 corrugated metal sheet
36 trapezoidal metal sheet
38 spar
40 double T support
42 trapezoidal metal sheet
44 trapezoidal metal sheet

The invention claimed is:

1. A self-drilling screw produced from an austenitic or other stainless base material (1), comprising a shank (12) which has a cutting or forming boring tip or thread crest (16, 18) arranged on a shank end and a hard edge layer (2) formed on a surface of the shank (12) in a region of the boring tip or thread crest (16) and at least in the region of a thread (15) connecting thereto,
   a hard coating (3) galvanically applied at least to the hard edge layer (2) of the boring tip or thread crest (16, 18), said hard coating comprises a layer containing a transition metal,
   and a topcoat (4) made of a lubricating and heat-dissipating material applied to the hard coating (3).

2. The self-drilling screw according to claim 1, wherein the lubricating and heat-dissipating material comprises at least one of metal, wax or lacquer.

3. The self-drilling screw according to claim 1, wherein the hard coating (3), together with the topcoat (4), has a thermal conductivity of λ>9 W/mK.

4. The self-drilling screw according to claim 1, wherein the topcoat (4) comprises a layer which intrinsically has differences in layer thickness of up to +/−60%.

5. The self-drilling screw according to claim 1, wherein the topcoat (4) comprises a layer which intrinsically has differences in layer thickness of up to +/−30%.

6. The self-drilling screw according to claim 1, wherein the topcoat (4) is mixed with metal particles.

7. The self-drilling screw according to claim 6, wherein the metal particles comprise $MoS_2$, Au, Ag or Cu.

8. The self-drilling screw according to claim 1, wherein the base material (1) has a hardness of from 100 to 300 HV0.1.

9. The self-drilling screw according to claim 1, wherein the hard edge layer (2) has a hardness of from 300 to 600 HV0.1.

10. The self-drilling screw according to claim 1, wherein the hard coating (3) has a serrated or beaded topography.

11. The self-drilling screw according to claim 1, wherein the hard coating (3) has a hardness of at least 700 HV0.1.

12. The self-drilling screw according to claim 1, wherein the hard coating (3) has a hardness of between 800 and 1400 HV0.1.

13. The self-drilling screw according to claim 1, wherein the hard coating (3) has a maximum thickness of 60 μm.

14. A connection comprising the self-drilling screw according to claim 1 connected to at least one steel connection element through which the self-drilling screw is drilled.

* * * * *